(12) United States Patent
Bianchi et al.

(10) Patent No.: US 9,753,143 B2
(45) Date of Patent: Sep. 5, 2017

(54) AIRCRAFT NAVIGATION SYSTEM AND METHOD OF NAVIGATING AN AIRCRAFT

(71) Applicant: Airbus Defence and Space GmbH, Taufkirchen (DE)

(72) Inventors: Cristiano Bianchi, Munich (DE); Winfried Lohmiller, Freising (DE)

(73) Assignee: AIRBUS DEFENCE AND SPACE GMBH, Taufkirchen (DE)

( * ) Notice: Subject to any disclaimer, the term of this patent is extended or adjusted under 35 U.S.C. 154(b) by 0 days.

(21) Appl. No.: 15/035,819

(22) PCT Filed: Nov. 10, 2014

(86) PCT No.: PCT/EP2014/003005
§ 371 (c)(1),
(2) Date: May 11, 2016

(87) PCT Pub. No.: WO2015/067374
PCT Pub. Date: May 14, 2015

(65) Prior Publication Data
US 2016/0299231 A1    Oct. 13, 2016

(30) Foreign Application Priority Data

Nov. 11, 2013    (EP) .................................... 13005294

(51) Int. Cl.
*G01S 1/00* (2006.01)
*G06F 19/00* (2011.01)
(Continued)

(52) U.S. Cl.
CPC .............. *G01S 19/32* (2013.01); *G01S 19/18* (2013.01); *G01S 19/21* (2013.01); *G05D 1/0022* (2013.01);
(Continued)

(58) Field of Classification Search
USPC ..................................................... 701/470, 14
See application file for complete search history.

(56) References Cited

U.S. PATENT DOCUMENTS 6,377,892 B1 *   4/2002   Johnson ................. G01C 21/00
                                              342/357.31
6,577,951 B1     6/2003   Johnson et al.
(Continued)

OTHER PUBLICATIONS

International Search Report, Jan. 15, 2015, priority document.
"Use of Military GPS in a Civil Environment", Jun. 25, 2003.

*Primary Examiner* — Tyler Paige
(74) *Attorney, Agent, or Firm* — Greer, Burns & Crain, Ltd.

(57) ABSTRACT

An aircraft navigation system and navigation method. The system comprises a civil-certified GPS-receiver for determining first position information based on C/A-GPS-signals, and a military-type GPS-receiver for determining a second position information based on P(Y)-GPS-signals. A monitoring unit detects a first abnormal condition during jamming conditions within the C/A-GPS-signals. The unit compares the first position information with the second position information and detects a second abnormal condition when a difference between these position information is larger than a threshold value for more than a threshold duration. Upon detecting an abnormal condition, an alert procedure is initiated. In remotely piloted aircraft, Command & Control link-loss is also monitored and during link-loss, a transponder code automatically indicates communication failure. When in such situation an abnormal condition is additionally detected, a transponder code indicates airborne emergency and, subsequently, the aircraft navigation system is switched to navigating based on position information from the military-type GPS-receiver.

10 Claims, 1 Drawing Sheet

(51) Int. Cl.
  *G01S 19/32*    (2010.01)
  *G01S 19/18*    (2010.01)
  *G01S 19/21*    (2010.01)
  *G05D 1/00*    (2006.01)
  *G08G 5/00*    (2006.01)

(52) U.S. Cl.
  CPC ......... *G05D 1/0077* (2013.01); *G08G 5/0004* (2013.01)

(56) References Cited

U.S. PATENT DOCUMENTS

| | | |
|---|---|---|
| 2004/0193334 A1 | 9/2004 | Carlsson et al. |
| 2005/0004723 A1* | 1/2005 | Duggan ............... G05D 1/0061 701/24 |
| 2005/0146459 A1 | 7/2005 | Dentinger et al. |
| 2007/0129855 A1* | 6/2007 | Coulmeau ............ G08G 5/0039 701/3 |
| 2014/0324255 A1* | 10/2014 | Siddiqi .................. B64D 25/00 701/14 |
| 2016/0299231 A1* | 10/2016 | Bianchi .................. G01S 19/18 |

* cited by examiner

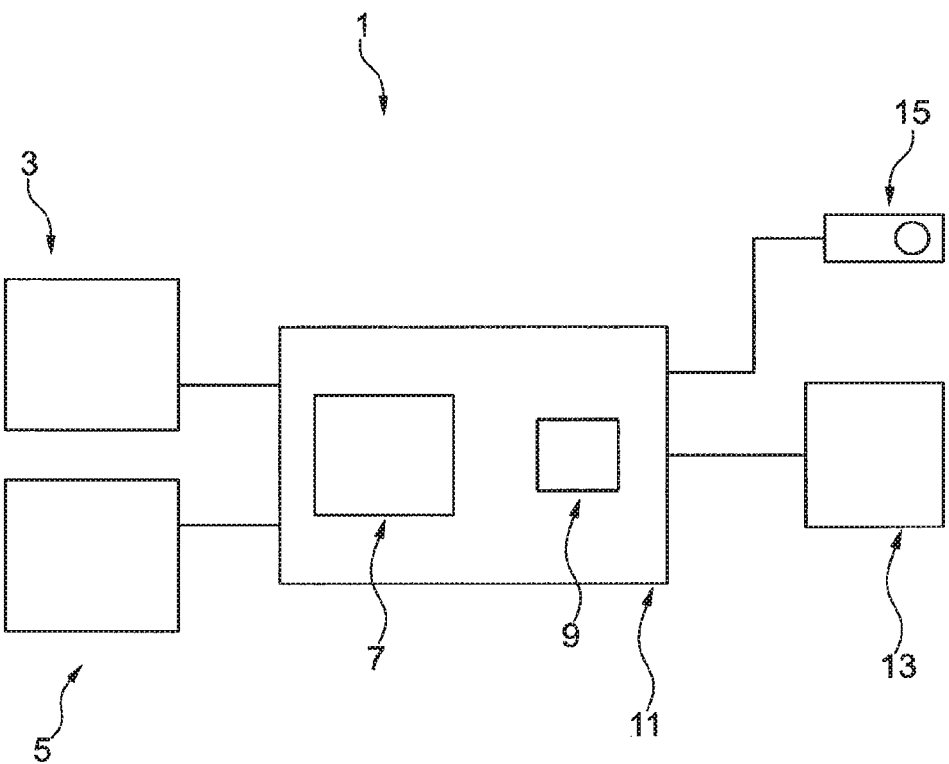

AIRCRAFT NAVIGATION SYSTEM AND METHOD OF NAVIGATING AN AIRCRAFT

CROSS-REFERENCES TO RELATED APPLICATIONS

This application claims the benefit of the European patent application No. 13005294.7 filed on Nov. 11, 2013, the entire disclosures of which are incorporated herein by way of reference.

FIELD OF THE INVENTION

The present invention relates to an aircraft navigation system and to a method of navigating an aircraft.

BACKGROUND OF THE INVENTION

Aircraft have to be navigated during flight. Manned aircraft are generally navigated by a pilot in command on board of the aircraft. Unmanned aircraft such as remotely piloted aircraft (RPA) are generally navigated automatically using on-board piloting computers. In some systems, high-level commands may be submitted by an off-board pilot being located, for example, in a ground control center and remotely piloting the aircraft using communication channels. Sometimes, RPAs are also referred to as unmanned aerial vehicles (UAV) or unmanned aerial systems (UAS).

In order to be able to follow a desired air route, navigation needs to be based on precise information about the present position of the aircraft. Typically, such position information should be three-dimensional (3D).

In modern aircraft, position information may be acquired using a GPS-receiver. Such a GPS-receiver is adapted to receive GPS-signals emitted by GPS-satellites and, based on such GPS-signals, determine position information for the aircraft.

Generally, GPS-satellites emit two types of GPS-signals. A first type is referred to herein as C/A-GPS-signals. Such signals are sometimes also referred to as course/acquisition code or C/A code. Such C/A-GPS-signals allow for a determination of a position information with sufficient precision for use in civil aircraft navigation. A second type of signal is referred to herein as P(Y)-GPS-signals. Such signals are also referred to as precision code or encrypted precision code. Generally, such P(Y)-GPS-signals allow for aircraft navigation with higher navigation precision than C/A-GPS-signals. Furthermore, as these P(Y)-GPS-signals are mainly intended for military navigation use, these signals are encrypted in order to minimize a risk of spoofing.

Generally, only military-type GPS-receivers are allowed to be used for determining position information based on P(Y)-GPS-signals. The technology of such military-type GPS-receivers is to be kept secret. Generally, military-type GPS-receivers are allowed to be used in "state aircraft" only, i.e., in aircraft for military applications, police applications, emergency management applications, and similar, such "state aircraft" typically being under governmental control.

On the other hand, civil aircraft are only allowed to be navigated using civil-certified GPS-receivers. Such civil-certified GPS-receivers are used for determining a position information based on C/A-GPS-signals. Each GPS-receiver used in civil aviation generally has to be certified by a governmental agency such as, e.g., the Federal Aviation Agency (FAA).

Unintentional or intentional GPS-signal-in-space degradation, sometimes referred to as "jamming," and intentional GPS-signal-in-space alteration by third parties, sometimes referred to as "spoofing," may pose a great threat to civil or military aviation since the aircraft position as measured by on-board civil or military GPS-receivers may be impaired, in the case of jamming, or deliberately altered, in the case of spoofing, by third parties on-ground and in-air. This may lead to degradation or loss of the aircraft GPS position and, in worst-case scenarios, even to deliberate aircraft hijacking.

Furthermore, communication channels may be jammed or spoofed. This may be especially problematic for remotely piloted aircraft since the pilot can no longer actively control the RPA. Communication channels can be protected against spoofing with encryption, but it is very hard to protect them against jamming.

U.S. Pat. No. 6,377,892 B1, US 2005/0146459 A1 and U.S. Pat. No. 6,577,951 B1 address aircraft navigation using different types of GPS-receivers.

SUMMARY OF THE INVENTION

There may be a need for an aircraft navigation system providing improved operation security, particularly providing improved security in case of C/A GPS jamming or spoofing Similarly, there may be a need for a method of navigating an aircraft with improved operation security.

According to a first aspect of the present invention, an aircraft navigation system is proposed to comprise at least one civil-certified GPS-receiver, at least one military-type GPS-receiver, monitoring unit and an alerting unit. Therein, the civil-certified GPS-receiver is adapted and configured to determine a first position information based on C/A-GPS-signals. The military-type GPS-receiver is adapted and configured to determine a second position information based on P(Y)-GPS-signals. The aircraft navigation system is adapted and configured to issue aircraft navigation signals based on the first position information when the aircraft is flying under normal navigation conditions in civil airspace. The monitoring unit is adapted and configured to detect a first abnormal navigation condition upon occurrence of jamming conditions within the C/A-GPS-signals. Furthermore, additionally or alternatively, the monitoring unit is adapted and configured to compare the first position information with the second position information and to detect a second abnormal navigation condition upon occurrence of a difference between the first position information and the second position information being larger than a threshold value for more than a threshold duration. The alerting unit is adapted and configured to initiate an alert procedure upon detection of one of the first and second abnormal navigation conditions.

According to a second aspect of the present invention, a method of navigating an aircraft is proposed. Therein it is assumed that the aircraft comprises an aircraft navigation system with a civil-certified GPS-receiver and a military-type GPS-receiver. The method comprises the steps of (a) navigating the aircraft according to aircraft navigation signals based on the first position information provided by the civil-certified GPS-receiver when the aircraft is flying under normal navigation conditions in civil airspace, (b) detecting a first abnormal navigation condition upon occurrence of jamming conditions within the C/A-GPS-signals, (c) comparing the first position information with the second position information and detecting a second abnormal navigation condition upon occurrence of a difference between the first position information and the second position information being larger than a threshold value for more than a threshold duration, and (d) initiating an alert procedure upon detection of one of the first and second abnormal navigation conditions.

According to a third aspect of the invention, a computer program product is proposed to comprise computer readable code which, when executed by a computer, is adapted to control the method according to the above second aspect.

According to a fourth aspect of the invention, a computer readable method comprising a computer program product according to the above third aspect is proposed.

Without limiting the scope of the invention, ideas to the above aspects may be understood as being based on the following findings and concepts:

Generally, in state aircraft, both types of GPS-receivers, i.e., a civil-certified GPS-receiver and military-type GPS-receiver, may be provided for aircraft navigation. However, in order to be allowed to enter civil non-segregated airspace, the aircraft needs to be certified to civil aviation standards. In order to fulfill such standards, it has to be guaranteed that, under all normal conditions, the aircraft is navigated using the civil-certified GPS-receiver only. Accordingly, while it is not prohibited to use the on-board military-type GPS-receiver, for example, in a war theater, i.e., in non-civil airspace, it is proposed herein to use such military-type GPS-receiver under normal navigation conditions in civil airspace, only in order to monitor or verify correct functioning of a civil-certified GPS-receiver used for aircraft navigation under such normal navigation conditions.

In order to determine whether the aircraft is flying under "normal" navigation conditions, on the one hand, a monitoring unit is adapted to detect occurrence of jamming conditions or spoofing conditions within the C/A-GPS-signal used by the civil-certified GPS-receiver. Particularly, the monitoring unit is adapted and configured to compare the first position information provided by the civil-certified GPS-receiver with the second position information provided at the same instant by the military-type GPS-receiver and to detect an abnormal navigation condition in case a difference between these first and second position information is larger than a threshold value for more than a threshold duration. For example, the threshold value may be 100 m difference in the horizontal position, and the threshold value duration may be 10 sec. When one of the first and second abnormal navigation conditions has been detected, the alerting unit initiates an alert procedure.

According to an embodiment of the invention, the alert procedure comprises transmitting a specific warning signal indicating abnormal navigation condition to a pilot. For example, such warning signal may be a visual signal, an acoustic signal or a haptic signal which alerts the pilot and informs about the abnormal navigation condition. For example, the warning signal may be transmitted to a cockpit of the aircraft in which the pilot is piloting the aircraft. Alternatively, for example, in a remotely piloted aircraft system (RPAS), such warning signal may be transmitted to a pilot in command situated inside an RPA ground control station (GCS).

According to a particularly advantageous embodiment of the invention, a specific reaction logic is proposed for the case of an abnormal navigation condition being detected. Such embodiment is specifically applicable to an aircraft navigation system which is specifically adapted for application in remotely piloted aircraft. Therein, the monitoring unit is further adapted for detecting a Command & Control link-loss while flying in civil airspace and for, upon such detection, automatically setting a transponder code in the aircraft to issuing a signal indicating communications failure. Furthermore, the alerting unit is adapted and configured to, upon detection of one of the first and second abnormal navigation conditions and simultaneous detection of Command & Control link-loss, automatically setting a transponder code in the aircraft to issuing a signal indicating airborne emergency and switching to issuing aircraft navigation signals based on the second position information. Such scenario may be part of the alert procedure.

In other words, in a remotely piloted aircraft, it is first monitored and detected whether a Command & Control (C2) link is lost during flight in civil airspace. If such C2 link-loss occurs, for example due to a technical failure or enemy jamming of the C2 link, the transponder code will be automatically set to a value of "7600," i.e., to a signal indicating communications failure, in order to inform civil Air Traffic Control (ATC) that the RPA has no communication means with the pilot in command Furthermore, in case during such phase the monitoring unit detects one of the above-mentioned first and second abnormal navigation conditions, i.e., detects jamming or spoofing within the C/A-GPS-signals and/or detects significant differences between the first position information and the second position information from the civil-certified and the military-type GPS-receivers, respectively, an alert procedure is initiated by the alerting unit which alert procedure comprises automatically setting the transponder code in the aircraft to a value of "7700" which indicates airborne emergency in order to inform civil ATC of the airborne emergency. Then, after informing the ATC about the communication failure and the airborne emergency, the aircraft navigation system may be switched to issuing aircraft navigation signals based on the second position information. In other words, in such emergency situation, the aircraft navigation system is allowed to use the military-type GPS-receiver for providing navigation signals to the aircraft and/or to the pilot.

According to an embodiment of the present invention, the civil-certified GPS-receiver is segregated with respect to the military-type GPS-receiver. This may mean that the two receivers are functionally and/or physically isolated from each other so that a failure of the one receiver cannot have influence on the second one, and vice versa.

According to an embodiment of the invention, the civil-certified GPS-receiver and the military-type GPS-receiver are comprised in different line replaceable units (LRU). However, the two receivers may also be contained in a common device or housing.

Possible features and advantages of embodiments of the present invention are described herein partly with respect to an aircraft navigation system and partly with respect to a method of navigating an aircraft. A person skilled in the art will recognize that the various features may be combined or replaced in suitable manners and may be transferred from the aircraft navigation system to the method of navigating an aircraft, and vice versa, in order to come to further embodiments of the present invention.

BRIEF DESCRIPTION OF THE DRAWINGS

Embodiments of the present invention will be described herein with reference to the enclosed drawing, wherein neither the description nor the drawing shall be interpreted as limiting the scope of the invention.

The FIGURE schematically shows an aircraft navigation system according to an embodiment of the present invention.

DETAILED DESCRIPTION OF THE PREFERRED EMBODIMENTS

The FIGURE shows an aircraft navigation system 1 according to an embodiment of the present invention. The aircraft navigation system 1 may be implemented, for example, in state aircraft such as military aircraft, police aircraft, emergency aircraft, etc.

The aircraft navigation system 1 comprises a civil-certified GPS-receiver 3 as well as a military-type GPS-receiver 5.

The civil-certified GPS-receiver 3 is adapted and configured to determine a first position information based on C/A-GPS-signals. Such first position information may, for example, indicate a current position of the aircraft with a precision of approximately 5-10 m accuracy. Such civil-certified GPS-receiver 3 may be certified for civil aviation, for example, by a governmental civil aviation agency.

The military-type GPS-receiver 5 is adapted and configured to determine a second position information based on P(Y)-GPS-signals. Such military-type GPS-receiver is generally not certified for civil aviation. As the aircraft is a state-type aircraft, it is allowed to carry such military-type GPS-receiver. Generally, military-type GPS-receivers are only allowed to be used outside civil airspace, particularly in war scenarios, or in emergency cases. Based on the encrypted P(Y)-GPS-signals, the military-type GPS-receiver may determine the second position information with a precision of generally less than 5 m accuracy, typically around 3 m accuracy.

Generally, the first position information and the second position information may relate to a same reference position within an aircraft. Furthermore, the first position information and the second position information may be acquired or determined simultaneously, i.e., at a same point in time.

The aircraft navigation system 1 further comprises a monitoring unit 7 and an alerting unit 9. These two units 7, 9 may be included in a common control device 11.

The monitoring unit 7 is adapted and configured to detect a first and/or second abnormal navigation conditions.

A first abnormal navigation condition is interpreted to occur upon jamming of the C/A-GPS-signals. For detecting such first abnormal navigation condition, the monitoring unit 7 may externally monitor the C/A-GPS-receiver and detect jamming if, e.g., a signal-to-noise-ratio unexpectedly presents steps or spikes over a long period. Alternatively, or additionally, a signal from the C/A-GPS-receiver, which might be subject to jamming, may be compared to a signal from the P(Y)-GPS-receiver, in which jamming may be suppressed.

Spoofing may generally not be determined based on the C/A-GPS-signal alone. However, a military-type GPS-receiver together with a Controlled Reception Pattern Antenna (CRPA) generally can detect and suppress jamming on its own and is insensitive to spoofing as the P(Y)-GPS-signals are encrypted. Thus, spoofing may be detected by comparison of a C/A-GPS-signal, which might be affected by spoofing, with a P(Y)-GPS signal, which is unaffected by spoofing.

Accordingly, the monitoring unit 7 is further adapted and configured to compare the first position information of the civil-certified GPS-receiver 3 with the second position information of the military-type GPS-receiver 5. The monitoring unit 7 is then adapted and configured to detect a second abnormal navigation condition in case a difference between these first and second position information is larger than a predetermined threshold value for more than a predetermined threshold duration. While the threshold value and the threshold duration are generally predetermined, they might depend on further parameters and/or variables such as parameters set by a pilot, parameters relating to a current flight situation, parameters characterizing the aircraft, etc.

The alerting unit 9 is adapted and configured to be informed about any detection of one of the first and second abnormal navigation conditions and to then initiate an alert procedure. For example, in such alert procedure, a transponder 13 of the aircraft may be controlled to transmit a specific transponder code to an air traffic control (ATC) in order to inform about any abnormal or emergency conditions. Furthermore, the alerting unit 9 may transmit a specific warning signal, for example, to a warning device 15 for informing the pilot about the abnormal navigation condition.

The civil-certified GPS-receiver 3 and the military-type GPS-receiver 5 are based on a segregated receiver's architecture which is compatible with approval for flight in civil non-segregated airspace. Thus, when the civil-certified GPS-receiver is referred to as a standard positioning service (SPS) GPS-receiver and the military-type GPS-receiver is referred to as a precise positioning service (PPS) GPS-receiver, the aircraft navigation system 1 has split and segregated SPS and PPS receivers contained in separate line replaceable units (LRUs).

In other words, in the aircraft navigation system 1, one or more civil-certified GPS-receiver(s) are utilized, possibly besides other navigation means, for aircraft positioning during flight in civil non-segregated airspace by a manned or unmanned aircraft. Additionally, one or more military-type GPS-receiver(s) are integrated on-board but segregated from the civil-certified GPS-receiver(s). Since this military equipment is not directly used for aircraft navigation, its integration and carriage in civil non-segregated airspace is allowed by regulations. A voter/monitor software module comprised in the monitoring unit 7 may continuously compare aircraft 3D GPS position from the civil-certified GPS-receiver(s) versus 3D GPS position from the military-type GPS-receiver(s). In case, GPS jamming or spoofing conditions are detected by the military-type GPS-receivers or by comparison of signals from the civil-certified GPS-receivers with signals from the military-type GPS-receivers and/or in case aircraft 3D GPS position from the military-type GPS-receivers diverts from 3D GPS position from the civil-certified GPS-receivers by more than a predefined threshold for longer than a predefined time period, an alert procedure is initiated. In such alert procedure, for example, a pilot in command will be alerted by appropriate cockpit warnings. For remotely piloted aircraft systems, such warnings may be displayed to the pilot in command inside an RPA ground control station.

Upon receiving this warning, the pilot in command can therefore, for example, choose to ignore system warnings and continue flight in civil non-segregated airspace based on aircraft 3D GPS position from the civil-certified GPS-receivers. Alternatively, the pilot in command may force a selection of the 3D GPS position from the military-type GPS-receivers for RPA steering, contact local air traffic control and negotiate an exit trajectory from civil non-segregated airspace.

In a specifically advantageous embodiment of a method of navigating an aircraft, which may be implemented using the aircraft navigation system 1, a special approval is contemplated, whereby air traffic management (ATM) authorities allow remotely piloted aircraft systems flying in civil non-segregated airspace to utilize aircraft 3D GPS position from the military-type GPS-receiver in case of detected jamming or spoofing, respectively, of the civil-certified GPS-receiver.

For an RPA under Command & Control (C2) link-loss, due to, e.g., technical failure or enemy jamming of the C2 link, in civil airspace, a transponder code will be automatically set to 7600, to inform civil ATC that the RPA has no communication means with the pilot in command. In case during this phase the above-mentioned voter/monitor software detects a civil GPS jamming or spoofing condition, it will automatically set the transponder code to 7700, to inform civil ATC of the airborne emergency and automatically switch to aircraft 3D GPS position from the military-type GPS-receivers for RPA steering.

Additionally, it is proposed for remotely piloted aircraft systems flying on missions including both flight in civil non-segregated airspace and in war theater with elevated GPS jamming/spoofing threat, to comprise a dedicated software switch in a flight control computer which may automatically switch between C/A-GPS data, i.e., using the civil-certified GPS-receiver, in civil airspace and P(Y)-GPS data, i.e., using the military-type GPS-receiver, in mission area according to a definition of a flight plan, unless the pilot in command selects the source explicitly.

Summarizing, embodiments of the invention allow monitoring and protecting a civil GPS positioning function of an aircraft, directly piloted or remotely piloted, against GPS jamming/spoofing threat, and reacting to such conditions during flight in civil non-segregated airspace.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft navigation system for an unmanned aircraft comprising:
   a civil-certified GPS-receiver,
   a military-type GPS-receiver, and
   a control device provided by a computer, the control device including a monitoring unit and an alerting unit,
   wherein the civil-certified GPS-receiver is configured to determine a first position information based on civil course/acquisition code GPS signals (C/A-GPS-signals),
   wherein the military-type GPS-receiver is configured to determine a second position information based on military precision code or encrypted precision code GPS signals (P(Y)-GPS-signals),
   wherein the aircraft navigation system is configured to issue aircraft navigation signals based on the first position information when the aircraft is flying under civil-certified navigation control in civil airspace,
   wherein at least one of:
   the monitoring unit is configured to detect jamming of the C/A-GPS-signals, or
   the monitoring unit is further configured to compare the first position information with the second position information, and to detect an occurrence of a difference between the first position information and the second position information being larger than a threshold value for more than a threshold duration, and
   wherein the alerting unit is configured to initiate an alert procedure upon detection of at least one of the jamming of the C/A GPS signals and the occurrence of the difference between the first position information and the second position information being larger than a threshold value for more than a threshold duration.

2. The aircraft navigation system of claim 1,
   wherein the aircraft navigation system is specifically configured for application in a remotely piloted aircraft and
   wherein the monitoring unit is further configured to detect a Command & Control link-loss while flying in civil airspace and for, upon such detection, automatically setting a transponder code in the aircraft to issuing a signal indicating communication failure, and
   wherein the alerting unit is further configured to, upon detection of one of the jamming of the C/A GPS signals and the occurrence of the difference between the first position information and the second position information being larger than a threshold value for more than a threshold duration and simultaneous detection of Command & Control link-loss, as part of the alert procedure automatically setting a transponder code in the aircraft to issuing a signal indicating airborne emergency and switching to issuing aircraft navigation signals based on the second position information.

3. The aircraft navigation system of claim 1, wherein the alert procedure comprises transmitting a specific warning signal to a pilot.

4. The aircraft navigation system of claim 1, wherein the civil-certified GPS-receiver is segregated with respect to the military-type GPS-receiver.

5. The aircraft navigation system of claim 1, wherein the civil-certified GPS-receiver and the military-type GPS-receiver are comprised in different line replaceable units.

6. A method of navigating an unmanned aircraft, the aircraft comprising an aircraft navigation system with
   a civil-certified GPS-receiver,
   a military-type GPS-receiver, and
   a control device provided by a computer,
   wherein the civil-certified GPS-receiver is adapted for determining a first position information based on civil course/acquisition code GPS signals (C/A-GPS-signals),
   wherein the military-type GPS-receiver is adapted for determining a second position information based on military precision code or encrypted precision code GPS signals (P(Y)-GPS-signals),
   the method comprising:
   determining the first position information by the civil-certified GPS-receiver,
   determining the second position information by the military-type GPS-receiver,
   the aircraft navigation system navigating the aircraft according to aircraft navigation signals based on the first position information when the aircraft is flying under civil-certified navigation control in civil airspace,
   at least one of
   detecting jamming of the C/A-GPS-signals, or
   comparing the first position information with the second position information, and detecting an occurrence of a difference between the first position information and the second position information being larger than a threshold value for more than a threshold duration, and
   initiating an alert procedure upon detection of one of the jamming of the C/A GPS signals and the occurrence of the difference between the first position information and the second position information being larger than a threshold value for more than a threshold duration.

7. The method of claim 6, further comprising:
detecting a Command & Control link-loss while flying in civil airspace and, upon such detection, automatically setting a transponder code in the aircraft to issuing a signal indicating communication failure, and
upon detection of at least one of the jamming of the C/A GPS signals and the occurrence of the difference between the first position information and the second position information being larger than a threshold value for more than a threshold duration and simultaneous detection of Command & Control link-loss, as part of the alert procedure, automatically setting a transponder code in the aircraft to issuing a signal indicating airborne emergency and switching to issuing aircraft navigation signals based on the second position information.

8. The method of claim 6, wherein the alert procedure comprises transmitting a specific warning signal to a pilot.

9. A non-transitory computer readable medium comprising computer readable code stored thereon which, when executed by a computer, is configured to control the method according to claim 6.

10. An aircraft navigation system comprising:
a civil-certified GPS-receiver,
a military-type GPS-receiver, and
a control device provided by a computer, the control device including a monitoring unit and an alerting unit,
wherein the civil-certified GPS-receiver is configured to determine a first position information based on civil course/acquisition code GPS signals (C/A-GPS-signals),
wherein the military-type GPS-receiver is configured to determine a second position information based on military precision code or encrypted precision code GPS signals (P(Y)-GPS-signals),
wherein the aircraft navigation system is configured to issue aircraft navigation signals based on the first position information when the aircraft is flying under civil-certified navigation control in civil airspace,
wherein at least one of:
the monitoring unit is configured to detect jamming of the C/A-GPS-signals, or
the monitoring unit is further configured to compare the first position information with the second position information, and to detect an occurrence of a difference between the first position information and the second position information being larger than a threshold value for more than a threshold duration, and
wherein the alerting unit is configured to initiate an alert procedure upon detection of at least one of the jamming of the C/A GPS signals and the occurrence of the difference between the first position information and the second position information being larger than a threshold value for more than a threshold duration.

* * * * *